United States Patent [19]

Matthews

[11] 4,044,794
[45] Aug. 30, 1977

[54] SLOW-OPENING GAS VALVE

[75] Inventor: Russell Byron Matthews, Goshen, Ind.

[73] Assignee: Johnson Controls, Inc., Milwaukee, Wis.

[21] Appl. No.: 630,166

[22] Filed: Nov. 10, 1975

[51] Int. Cl.$^2$ ............................................. F23N 5/24
[52] U.S. Cl. ..................................... 137/613; 137/66; 431/54
[58] Field of Search ...................... 137/66, 489, 612.1, 137/613; 431/51, 53, 54

[56] References Cited

U.S. PATENT DOCUMENTS 2,297,854 10/1942 Alfery ..................................... 431/54

FOREIGN PATENT DOCUMENTS 774,987 1/1968 Canada ................................. 137/613

*Primary Examiner*—Alan Cohan
*Assistant Examiner*—Gerald Michalsky
*Attorney, Agent, or Firm*—Johnson, Dienner, Emrich & Wagner

[57] ABSTRACT

A gas valve having first and second redundant valve members, disposed in a passageway between an inlet and an outlet of the valve which are individually operable to open and close respective inlet and outlet valve ports, and a pressure regulating apparatus interposed between the inlet and outlet valve ports operable to supply gas to the outlet valve port initially at a pressure lower than the inlet pressure when the first and second valve members are operated to open respective valve ports, and to gradually increase the pressure of the gas supplied to the outlet valve port until the outlet pressure equals a value intermediate the inlet pressure and the initial outlet pressure, as established by a pressure regulator spring of the pressure regulating apparatus. The gas valve is disclosed with reference to an application in a fuel ignition system to regulate gas flow to a combustion box to minimize ignition noise and rollout of gas flame from the combustion box.

8 Claims, 4 Drawing Figures

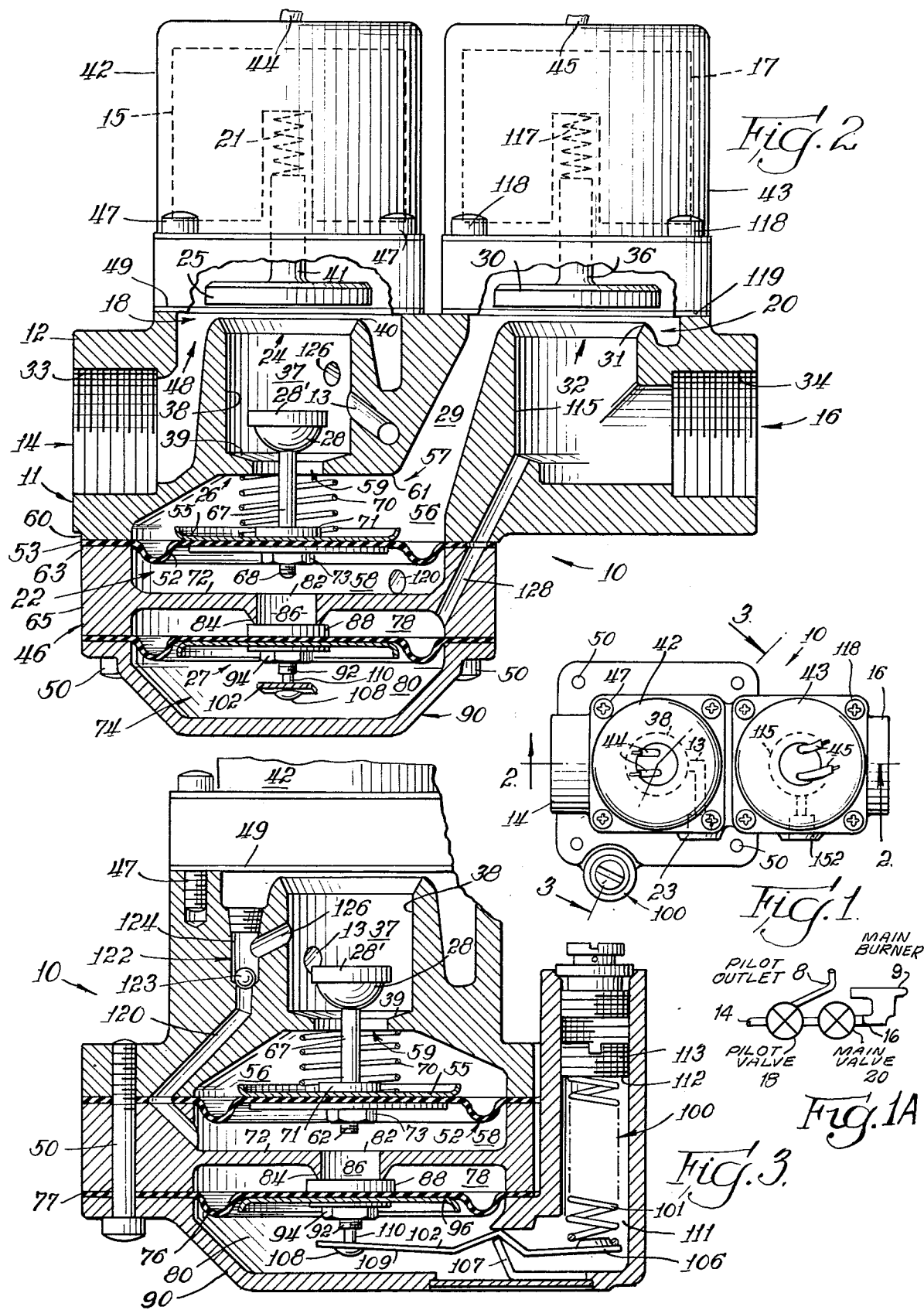

SLOW-OPENING GAS VALVE

BACKGROUND OF THE INVENTION

1. Field of the Invention

This invention relates to fluid flow valves, and more particularly, to a fluid flow control valve having redundant valve members and regulating apparatus which provides slow opening for the valve.

2. Description of the Prior Art

In heating systems of the pilot ignition type, a pilot vave is energized in response to a request for heat, supplying pilot gas to a pilot outlet for ignition to establish a pilot flame. Once the pilot frame is proven, a main gas valve is operated to supply gas to a main burner apparatus located within a combustion box of a furnace, for ignition by the pilot flame.

There is a trend in the heating industry to provide furnaces which have small combustion boxes. In such furnaces, when the pilot is proven and the main gas valve is energized to supply gas to the main burner apparatus, the main gas valve opens rapdily, supplying gas at maximum pressure to the main gas burner apparatus. In furnaces having small combustion boxes, there may be a small explosion or rollout of gas flames from the chamber accompanied by a loud noise. Such condition is undersirable from a customer's standpoint. Accordingly, it would be desirable to have a gas valve which regulates the flow of gas supplied to a main gas burner apparatus prior to ignition, such that upon operation of the main gas valve, gas is supplied to the main gas burner apparatus at low pressure for ignition, and the pressure of the gas supplied to the burner apparatus is thereafter gradually increased to the system pressure.

SUMMARY OF THE INVENTION

It is therefore an object of the present invention to provide a slow-opening gas valve which provides an initial low pressure output upon operation of the valve and gradually increases the output pressure until the system pressure is reached.

Another object of the invention is to provide a fluid control valve having first and second redundant valve members which are individually operable in sequence to control fluid flow from an inlet to an outlet of the valve.

It is another object of the present invention to provide a fluid flow control valve which automatically regulates fluid flow from an inlet to an outlet of the valve.

It is yet another object of the present invention to provide a gas valve for use in an automatic fuel ignition system for supplying gas to a combustion box and which mimimizes ignition noise and rollout of gas flame from the combustion box when the gas is ignited.

These and other objects are achieved by the present invention which has provided a fluid flow control valve having first and second redundant valve means disposed within a central body portion of the valve to control gas flow through a passageway interconnecting an inlet and an outlet of the valve. The first and second valve means comprise a first valve member disposed relative to a valve inlet port to open and close the valve inlet port, and a second valve member disposed relative to a valve outlet port to open and close the valve outlet port. The valve further includes a pressure regulator means disposed within the passageway and interposed between the valve inlet port and the valve outlet port for regulating the flow of fluid from the inlet port to the outlet port. When the first valve member is operated to open the valve inlet port, fluid is supplied over said pressure regulater means to the valve outlet port. Upon operation of the second valve member, the valve outlet port is opened, enabling fluid to be supplied over the outlet port to the outlet of the valve at low pressure. The pressure regulator means responds to the operation of the second valve member to gradually increase the flow of fluid to the outlet port, and thus to the outlet of the valve, until the outlet pressure equals the inlet pressure. Thereafter, the pressure regulating means continually operates to regulate fluid flow through the valve to compensate for increases or decreases in the inlet pressure to thereby maintain a substantially constant flow rate from the outlet of the valve.

The fluid flow control valve is described with reference to an application in a heating system to control the supply of fuel to a pilot burner apparatus and a main burner apparatus of the system. In such application, the first valve means is operable to supply fuel to the pilot burner apparatus and when the fuel supplied to the pilot burner apparatus is ignited and proven, the second valve means is operated to supply fuel to the main burner apparatus, initially at low pressure to enable the fuel supplied to the main burner to light softly at low pressure. The regulator means responds to the operation of the second valve means to gradually increase the pressure of fuel supplied to the main burner apparatus until system pressure is reached. Accordingly, the slow-opening valve minimizes ignition noise at the main burner and rollout of flame from the combustion box.

The fuel for the main burner apparatus flows through both ports to provide redundancy. Thus, in the event the first valve means is deenergized to cut off the supply of fuel to the pilot burner apparatus, the supply of fuel to the main burner apparatus is also interrupted.

DESCRIPTION OF THE DRAWINGS

FIG. 1 is a top plan view of a gas valve embodying the principles of the present invention;

FIG. 1A is a simplified representation of the gas valve of FIG. 1 connected to supply fuel to a pilot burner and a main burner apparatus of a fuel ignition system;

FIG. 2 is a sectional view of the gas valve taken along lines 2—2 of FIG. 1; and, FIG. 3 is a fragmentary sectional view of the gas valve taken along lines 3—3 of FIG. 1.

DESCRIPTION OF A PREFERRED EMBODIMENT

Referring to the drawings, FIG. 2 is a partial sectional view taken along lines 2—2 of FIG. 1, of a fuel flow control valve 10 which embodies the principles of my invention. The valve 10 has housing 11 including a main body portion 12 having an inlet 14 formed therein at the left hand side, and an outlet 16 formed therein at the right hand side. Redundant valve assemblies 18 and 20, and a pressure regulating apparatus 22, which are disposed within the valve housing 11, control the flow of fuel through the valve 10 from the inlet 14 to the outlet 16.

By way of example, the valve 10 is described with reference to an application in an automatic fuel ignition system of the pilot ignition type for supplying gaseous fuel to a pilot burner 8, shown schematically in FIG. 1A, and a main burner apparatus 9 of the system. Valve assembly 18, which is disposed adjacent the inlet 14 of the valve, controls the flow of fuel to the pilot burner apparatus 8, and valve assembly 20 which is disposed adjacent the outlet 16 of the valve 10, controls the flow of fuel to the main burner apparatus 9. The pilot gas or inlet valve assembly 18 includes a valve disc 25 which is lifted off valve seat 40 upon energization of a pilot valve solenoid 15, represented by the dotted lines in FIG. 2, to permit gas supplied to inlet 14 from a fuel supply to flow through inlet port 24 and to the pilot burner 8 via a passageway 13 formed in an inner wall 38 of the main valve body portion 12.

Following operation of the pilot valve 18, a regulating valve 26 of the regulating apparatus 22, including a regulator stud 28 carried by a pressure diaphragm 52, is operated to control the flow of gas through a regulator port 59 to an intermediate chamber 29 which serves as an inlet to the main gas or outlet valve assembly 20.

The main valve assembly 20 includes a valve disc 30 which is lifted off valve seat 31 upon energization of a main gas valve solenoid 17, represented by the dotted lines in FIG. 2, to permit gas to flow from the intermediate chamber 29 and outlet port 32 to the outlet 16 of the valve 10. The outlet 16 of the valve 10 is connected to the main burner apparatus 9.

The regulating apparatus 22 further includes a control valve assembly 27, including a valve disc member 88 carried by a diaphragm 76, which establishes the outlet pressure for the valve by providing a reference pressure for the pressure diaphragm 52 of regulating valve 26 in accordance with the setting of a manually adjustable bias assembly 100, including a compression spring 101 and a lever arm 102 which apply a bias to the diaphragm 76 to bias valve disc 88 into flow-preventing position relative to port 86. The bias assembly 100 is shown in FIG. 3. The control valve 27 is operable, when the main valve 20 is opened, to control the operation of the regulating valve 26 to initially supply gas to the outlet port 32 at low pressure and to gradually increase the outlet pressure to a desired value as determined by the force provided by the bias assembly 100.

Referring to FIG. 1, the pilot valve solenoid 15 and the main valve solenoid 17 are contained within respective housings 42 and 43, which are disposed in side by side relationship on the upper portion of the main valve body 12 and are connectable via leads 44 and 45 to a suitable control circuit (not shown) operable to energize the pilot valve solenoid 15 to operate the pilot valve 18, permitting gas to be supplied to the pilot burner 8 for ignition to establish a pilot frame. When the pilot gas has been ignited and the pilot flame proven, the control circuit energizes the main gas valve solenoid 17 to operate the main gas valve 20 to supply fuel to the main burner apparatus 9 for ignition by the pilot frame.

Considering the valve 10 in more detail, with reference to FIG. 2, the main body portion 12 of the valve housing 11 has a threaded inlet portion 33 to facilitate connection to a gas source, and a threaded outlet portion 34 to facilitate connection to the main burner apparatus 9. A cylindrical inner vertical wall 38 and a horizontal wall portion 39 of the main body portion 12 define a chamber 37 and an upwardly extending knife-edge 40 of the vertical wall 38 forms a circular opening which defines the inlet port 24 at the upper end of the chamber 37. Valve disc 25 of pilot valve 18 is provided to open the valve inlet 14 to the inlet port 24 via passageway 48. The valve disc 25 is carried by a plunger 41 and is lifted off the port 24 upon actuation of the pilot valve solenoid 15 which is located within housing 42 which is shown partially cut away in FIG. 2 to illustrate the valve disc 25 and plunger 41. The housing 42 is mounted on the main body portion 12 by suitable screws 47. A gasket 49, disposed between the housing 42 and the main body portion 12, provides a fluid tight seal between the housing 42 and the valve body 12. A suitable bias element, such as a compression spring 21, normally urges the valve disc 25 into engagement with valve seat 40 such that valve 18 is normally closed when the solenoid 15 is deenergized.

The passageway 13, which serves as a pilot outlet, extends through the inner wall 38 of body portion 12 to the outside of the valve housing 11 at compression coupling 23 (FIG. 1) which permits connection to the pilot burner apparatus over a suitable gas conduit (not shown). The pilot outlet is taken out between valve seat 40 and regulator port 59 to keep the pilot flame from being sucked out when the main gas port 32 is opened.

The valve housing 11 further includes a regulator body portion 46 and an associated cover portion 90 which are secured to the main body portion 12 by screws 50. A recessed horizontal wall 72 of the regulator body portion 46, and the lower surface 61 of horizontal wall 39 of the main body portion 12 define a central cavity 57 for the housing 11, in which is disposed the regulating valve assembly 26.

The regulating valve assembly 26 includes pressure diaphragm 52 and a regulator spud 28 which is carried by the diaphragm 52 and is provided to open and close a regulator port 59, which is defined by a beveled aperture formed in the horizontal wall 39 of main body portion 12. The diaphragm 52 has its marginal edge 53 sandwiched between the lower edge 60 of the outer wall of the main body 12 and the upper edge 63 of the outer wall 65 of the regulator housing 46 in an outstretched condition to divide the central cavity 57 into upper and lower chambers 56 and 58, respectively. The diaphragm is clamped between the main body portion 12 and the regulator portion 46 by screws 50 which extend through apertures in the marginal edge of the diaphragm 52. Sealing means, such as gaskets (not shown), may be installed on opposite marginal edges of the diaphragm 52 to provide a fluid-tight seal.

A shaft 67 of the regulator spud 28 extends through the aperture 59, and carries a valve member 28' at one end thereof, which is adapted to seat in the aperture 59 to close the regulator port. The lower end of shaft 67 is secured to the diaphragm 52 by a suitable mounting means which may comprise externally threaded stud portion 68 of the shaft 67 extending through suitable apertures in the diaphragm 52 and a backup plate, or reinforcing member 55, overlying the diaphragm 52. The diaphragm 52 and backup plate 55 are clamped between a flange 71 of the spud 28 and a nut 73 threaded on the stud portion 68. The backup plate 55 serves as a stiffening member for the diaphragm 52 and also defines the effective area of the diaphragm 52 as is well known in the art. A compression spring 70, which is disposed between the lower surface 61 of horizontal wall 39 and the upper surface 75 of the backup plate 55, biases regulator spud 28 to a flow-preventing position relative to the valve seat 59.

For the purpose of permitting regulator stud 28 to be lifted off regulator port 59, a passageway 120, best seen in FIG. 3, is formed in the outer wall of the main body portion 12 to permit the flow of gas from the inlet port 24 to the lower chamber 58 of the central cavity 57 when the pilot valve 28 is operated. A ball-check valve 122, including a ball member 123 is disposed within an enlarged portion 124 of the passageway 120 to permit limited flow of gas past the ball member 123 into chamber 58 and thereby control the opening rate of regulator spud 28. Also, upon deenergization of the pilot solenoid 15 which permits the pilot valve 18 to close, the ball-check valve 122 operates to dump gas contained within chamber 58 into chamber 37, as the ball 123 is moved past opening 126, to permit the gas to flow through the passageway 13, thereby reducing the pressure within chamber 58 and permitting regulator stud 28 to be moved to a flow-preventing position relative to regulator port 59.

The lower surface of the horizontal wall 72 of body portion 46 and the cover member 90 define a lower cavity 74 which contains the control valve assembly 27. A pressure diaphragm 76 extending within cavity 74 divides the cavity 74 into two chambers 78 and 80.

The diaphragm 76 has its marginal edge 77 sandwiched between the body portion 46 and the cover portion 90. Suitable gaskets may be provided between the upper and lower marginal edges of the diaphragm 76 to provide a fluid tight seal between the cover 90 and the body portion 46.

Referring to FIG. 3, the horizontal wall portion 72 has a central aperture 82 having a downwardly extending knife-edge 84 which defines a control port 86. The valve disc 88 which is carried by diaphragm 76, is provided to open and close the port 86. The valve disc 88 is secured to the diaphragm 76 by way of a threaded push rod 92 and a nut 94. A backup plate 96 is interposed between the nut 92 and the diaphragm 76. Valve disc 88 is biased to the closed position by ways of an actuator spring assembly 100, which is also operable to control the force on the diaphragm 76. The assembly 100 includes lever arm 102 which extends generally horizontally within the lower chamber 80, and an adjustment apparatus, including compression spring 101, which applies a force to one end 106 of the lever arm 101 which is transmitted via a pivot 107 to the other end 109 of the lever arm 102, which has a dimple 108 which receives the lower end 110 of threaded shaft 92. The spring 101 is disposed within a chamber 111 within a extension of the cover 90, and is compressed between the lower edge 112 of an adjustment screw 113 and end 106 of the lever arm 101. Adjustment screw 113, which is received in a threaded opening of chamber 111, is adjustable to vary the force applied to valve disc 88 and thus the pressure required to open the port 86.

Referring again to FIG. 2, considering the main valve assembly 20, a vertically extending inner wall 115 of the valve body 12 has circularly extending projections defining a knife-edge 31 which defines the outlet port 32. The valve disc 30, which is normally biased to a closed position by compression spring 117, is connected to valve stem 36 which extends within the main valve solenoid 17 which is housed within housing 43. Housing 43 is secured to the valve housing 11 by screws 118 and gasket 119 which provide a liquid tight seal. The solenoid 17 is operable to provide vertical movement for the shaft 36 to lift the valve disc 30 off the outlet port 32 to permit gas to flow the intermediate chamber 29 over the outlet port 32 to the outlet 16 of the valve 10.

A passageway 128 extends through the main body portion 12 and regulator body portion 36 from the outlet 32 to chamber 78 to supply a control pressure to diaphragm 76, whenever valve 20 is operated, permitting the control port 86 to be opened, varying the pressure in lower chamber 58, beneath diaphragm 52 of the regulator valve assembly 26. Accordingly, an increase in the outlet pressure relative to the pressure value established by bias spring 101 causes a decrease in the pressure in chamber 58 resulting in downward movement of diaphragm 52 and thus regulator spud 28, decreasing the flow of gas to the outlet port 32. Conversely, a decrease in outlet pressure effects an increase in the pressure in chamber 58 resulting in upward movement of regulator spud 28, increasing the flow of gas to the outlet port 32.

OPERATION

In response to a request for heat, as detected by a thermostat, for example, the pilot valve solenoid 15 is energized causing the valve disc 25 to be lifted off the valve seat 40, permitting gas supplied to the inlet 14 from a gas source to flow through the inlet port 24 to chamber 37 and, thus out of the passageway 13 to the pilot burner apparatus 8 for ignition to establish a pilot frame.

The gas also flows past ball-check valve 122 and through passage 120 into chamber 58 below diaphragm 52. Since the main gas valve 20 is closed, the chamber 56 above diaphragm 52 is sealed, enabling the gas flow through inlet port 24 and passageway 120 to create a pressure within chamber 58 which operates on diaphragm 52 to move the regulator spud 28 a very small amount vertically off the regulator port 59, enabling a small amount of gas to flow into chamber 56 above diaphragm 52. The pressure above diaphragm 52 equalizes with the pressure below the diaphragm 52 as long as the main gas valve 20 is closed.

As soon as the pilot flame is established, the main valve solenoid 17 is energized, causing valve disc 30 to be lifted off valve seat 31, permitting gas to flow through outlet port 32 and to the main burner 9. When the main gas valve 20 operates, the pressure within chamber 56 above diaphragm 52 decreases as gas from chamber 56 flows through outlet port 32 to the outlet 16 of the gas valve 10. Accordingly, gas flow across the ball check valve 122 and into chamber 58 increases the pressure in chamber 58 thereby causing diaphragm 52 to move regulator spud 28 further off the regulator port 59, increasing the flow of gas over the main valve port 32 to the outlet 16 of the valve 10.

The ball-check valve 122 limits the flow of gas past the ball 123 into passageway 120 and chamber 58, thereby controlling the opening rate of regulator spud 28, and the flow of gas to the main burner. The time for regulator valve 26 to open sufficiently to provide system pressure to the outlet 16 of the gas valve 10 may, for examle, be approximately 8 seconds.

The main burner lights softly without rollout at the initial low pressure, and the flow increases as the regulator spud 28 moves away from the regulator port 59. The distance that regulator spud moves away from regulator port 59 is a function of the pressure in chamber 58 below the diaphragm 52. The pressure in chamber 58 is controlled by the control valve 27 and is a function of the bias apparatus 100 which supplies a bias to diaphragm 76 to control the positioning of control valve disc 88 relative to control port 86.

Referring to FIG. 2, when valve disc 30 of the main gas valve is lifted off the outlet port 32, gas flows through passageway 128 to chamber 78, which is above diaphragm 76, increasing the pressure within chamber 78 causing diaphragm 76 to move downwardly, moving valve 88 off port 86 just enough to bleed off gas from chamber 58, to decrease the pressure in chamber 58, controlling the position of the regulator spud 28 to hold the outlet pressure at a desired value, as determined by the force of bias member 100. The regulating function continues until the outlet pressure corresponds to a desired pressure, typically the inlet pressure.

When the desired outlet pressure is reached at the outlet 16 of the valve 10, regulator action is provided as follows. In the event of an increase in the inlet pressure, a corresponding pressure is eventually obtained at the outlet 16, causing an increase in the amount of gas which flows through passageway 128 to chamber 58. Accordingly, diaphragm 76 is moved downwardly, moving valve disc 88 away from port 86, decreasing the pressure in chamber 58 and permitting the regulator spud 28 to move toward a flow preventing position relative to regulator port 58, to compensate for the increase in inlet pressure.

Similarly, a decrease in the inlet pressure results in a decrease in the amount of gas supplied through passageway 128 to chamber 78, permitting diaphragm 76 to move disc member 88 toward a flow preventing position relative to port 86 just enough to increase the pressure in chamber 58 to set regulator spud 28 a greater distance from regulator port 59, increasing gas flow through regulator port 59 to compensate for the change.

As indicated above, the main burner gas flows through the pilot port 24 and the main port 32 to provide redundancy. Thus, whenever the pilot valve 18 is closed, the supply of gas to the main valve is interrupted. Whenever the pilot valve 18 operates to close the inlet port 24, the ball-check valve 122 dumps the gas in chamber 58 to the pilot outlet 73, decreasing the pressure in chamber 58 permitting regulator spud 29 to be moved down to close regulator port 59.

Accordingly, on a fast recycle of the thermostat which controls the energization of the pilot valve solenoid 15, the regulator port 59 is closed in order to provide the slow opening operation for the valve 10 which affords ignition of the main burner on the next cycle, with minimum ignition noise and without rollout.

Thus, once a pilot frame is established and proven, the valve 10 is operable to initially supply gas to the main burner apparatus at a low pressure upon operation of the main gas valve 20, and the regulating apparatus 22 of the valve 10 causes pressure to the outlet 16 of the valve 10 to be gradually increased once the valve 10 has been operated.

The valve 10 may also be used in direct ignition systems, that is systems which do not employ a pilot source. In such application, the valve 10 is operable to provide initial low pressure to the main burner apparatus upon opening of the valve.

I claim:

1. A fluid flow control valve comprising a housing, including a main body portion having a central passageway interconnecting an inlet and an outlet of said valve, said main body portion having first and second ports formed therein between said inlet and said outlet of said valve, a first valve member disposed in open and close said first port, a second valve member disposed to open and close said second port, and regulator means interposed between said first port and said second port for regulating the flow rate from said first port to an inlet of said second port, said regulator means including regulator valve means having a regulating valve member disposed to normally close a regulator port disposed within said central passageway between said first and second ports, and first actuator means responsive to fluid flow through said first port following operation of said first valve member to open said first port to control said regulating valve member to open said regulator port to permit fluid flow at a first rate from said first port to said inlet of said second port, said second valve member being operable to open said second port to enable fluid supplied to said inlet of said second port to flow to said outlet, and control valve means responsive to fluid flow through said second port to control said first actuator means to increase the fluid flow rate through said regulator port to thereby increase the pressure of fluid supplied to said outlet to a predetermined value.

2. A fluid flow control valve as set forth in claim 1 wherein said first actuator means comprises pressure diaphragm means disposed within a central cavity of said main body portion dividing said cavity into a first chamber communicating with said regulator port and said inlet of said second port and a second chamber communicating with said first port over a first control passageway formed in an inner wall of said main body portion to permit fluid flow from said first port to said second chamber to operate said regulator valve means.

3. A fluid flow control valve as set forth in claim 2 including restriction means disposed within said first control passageway to limit fluid flow between said first port and said second chamber.

4. A fluid flow control valve as set forth in claim 3 wherein said restriction means comprises ball-check valve means.

5. A fluid flow control valve as set forth in claim 2 wherein said control valve means comprises a further pressure diaphragm means disposed within an inner cavity of said housing dividing said inner cavity into third and fourth chambers, said control valve means having a fourth valve member operatively connected to said further diaphragm means and disposed to open and close a control port communicating with said second and third chambers, and bias means for biasing said further diaphragm means to normally maintain said fourth valve member in a flow preventing position relative to said control port, said third chamber communicating with said second port over a second control passageway formed in a further inner wall of said main body portion to permit fluid flow from said second port to said third chamber to control the operation of said control valve means.

6. A fluid flow control valve as set forth in claim 5 wherein said bias means includes a lever arm means extending within said fourth chamber and having a first end engaging said second diaphragm means and a second end, spring bias means for applying a force to said second end of said lever arm means for application to said second diaphragm means over said lever arm, and adjustment means for adjusting the force of said spring bias means.

7. A fluid flow control valve comprising a housing including a main body portion having a central passageway interconnecting an inlet and an outlet of said valve, said main body portion having first and second ports formed therein between said inlet and said outlet, a first valve member disposed to open and close said first port, a second valve member disposed to open and close said second port, and regulating means including regulating valve means having a third valve member operable to open and close a regulator port interposed between said first port and said second port, said regulating valve means including pressure diaphragm means disposed within a first cavity of said housing, defining first and second chambers, said first chamber communicating with an inlet of said second port, and wtih said first port whenever said regulator port is open, said second chamber communicating with said first port over a first control passageway formed in said main body portion for enabling fluid flow over said first control passageway from said first port to said second chamber whenever said first valve member is operated to open said first port, said third valve member being operatively connected to said diaphragm member to be moved in response to a control pressure established within said second chamber as the result of fluid flow from said first port to said second chamber through said first control passageway, to open said regulator port, thereby permitting fluid flow to said inlet of said second port, said second valve member being operable to open said second port to permit fluid flow to said outlet of said valve, said regulating means including control valve means having a further diaphragm means disposed within a second cavity of said housing, defining third and fourth chambers, said third chamber communicating with said second port over a second control passageway and with said second chamber over a control port whenever said control port is open, and a fourth valve member operatively connected to said second diaphragm means and disposed to open and close said control port, in response to fluid flow over said second control passageway from said second port to said third chamber when said second valve member is operated for causing said further diaphragm means to position said fourth valve member relative to said control port to thereby regulate the control pressure in said second chamber.

8. In a fluid flow control valve, a housing including a main body portion having a central passageway interconnecting an inlet and an outlet of said valve, said main body portion having a first port formed in said passageway between said valve inlet and said valve outlet, a first valve member disposed to open and close said first port, and regulator valve means interposed between said valve inlet and said first port for regulating the flow rate from said valve inlet to an inlet of said first port, said regulator valve means having a regulating valve member for controlling fluid flow through a second port disposed within said central passageway between said valve inlet and said first port, and actuator means responsive to fluid flow through said valve inlet to control said regulating valve member to permit fluid flow at a first rate from said valve inlet to said inlet of said first port, said first valve member being operable to open said first port to enable fluid supplied to said inlet of said first port to flow to said valve outlet, control valve means responsive to fluid flow through said first port to control said actuator means to increase the fluid flow rate through said second port to thereby increase the pressure of fluid supplied to said valve outlet to a predetermined value.

* * * * *

UNITED STATES PATENT OFFICE
CERTIFICATE OF CORRECTION

Patent No. 4,044,794      Dated August 30, 1977

Inventor(s) Russell Byron Matthews

It is certified that error appears in the above-identified patent and that said Letters Patent are hereby corrected as shown below:

Column 7, line 60, change "in" to -- to --.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*